(12) United States Patent
Wagner et al.

(10) Patent No.: US 7,135,959 B2
(45) Date of Patent: Nov. 14, 2006

(54) APPARATUS AND METHOD FOR WIRELESS DOORBELL AND SECURITY CONTROL PANEL INTERACTION

(75) Inventors: Harold Wagner, Ridge, NY (US); Robert J. Orlando, Nesconset, NY (US)

(73) Assignee: Honeywell International, Inc., Morristown, NJ (US)

( * ) Notice: Subject to any disclaimer, the term of this patent is extended or adjusted under 35 U.S.C. 154(b) by 157 days.

(21) Appl. No.: 10/889,833

(22) Filed: Jul. 13, 2004

(65) Prior Publication Data
US 2006/0012466 A1    Jan. 19, 2006

(51) Int. Cl.
G08B 5/36    (2006.01)
G08B 3/00    (2006.01)
H04M 9/00    (2006.01)

(52) U.S. Cl. ............ 340/286.11; 340/330; 340/825.72; 379/167.05; 379/167.07; 379/167.11

(58) Field of Classification Search ........... 340/286.11, 340/330; 379/167.05, 167.07, 167.08, 167.11, 379/167.12
See application file for complete search history.

(56) References Cited

U.S. PATENT DOCUMENTS 4,243,973 A * 1/1981 Sandidge ............... 340/825.36
5,428,388 A * 6/1995 von Bauer et al. ......... 348/155
5,673,016 A * 9/1997 Lutes .......................... 340/326
6,218,938 B1 * 4/2001 Lin ............................. 340/540
2004/0085206 A1 * 5/2004 Yeh ............................. 340/540

* cited by examiner

Primary Examiner—Donnie L. Crosland
(74) Attorney, Agent, or Firm—Scully, Scott, Murphy & Presser, P.C.

(57) ABSTRACT

An apparatus and method for wireless doorbell and security control panel interaction is provided. The system includes a wireless doorbell, a security control panel, and at least one control panel activation device having a transmitter and a manually activated switch or button. The control panel is in communication with the at least one control panel activation device by way of the transmitter. The control panel includes a receiver for receiving signals transmitted from the at least one control panel activation device via the transmitter. A security keypad having a speaker device for broadcasting an alarm or message related to functions of the security system is in communication with the control panel as well. At least one auxiliary security device is also in communication with the control panel. The auxiliary security device may include an assortment of devices that perform ancillary functions that enhance the functionality of the security control panel.

22 Claims, 4 Drawing Sheets

APPARATUS AND METHOD FOR WIRELESS DOORBELL AND SECURITY CONTROL PANEL INTERACTION

FIELD OF INVENTION

The present invention relates to the field of home and commercial security systems and the activation and control of auxiliary security devices that are associated with the security system.

BACKGROUND OF INVENTION

Currently, home and commercial security systems that utilize a main security alarm component and an independent ancillary security device to enhance the effectiveness of the security system typically require that the security system and ancillary device be hard-wired in order to activate the systems. Further, any doorbell device associated with the home or commercial structure would also typically have a hard-wire configuration.

The present invention provides for the wireless activation of a doorbell and auxiliary security device that are associated with a home or commercial structure equipped with a security system.

SUMMARY OF INVENTION

The present invention relates to an apparatus and method for wireless doorbell and security control panel interaction.

An embodiment of the present invention comprises a wireless doorbell and security control panel activation system. The system has a transmitter, wherein the transmitter comprises a manual activation means. The system also has a control panel that is in communication with the transmitter. The control panel comprises a receiver for receiving signals transmitted from the transmitter. A security keypad is in communication with the control panel, wherein the keypad comprises a speaker device for broadcasting an alarm or messages related to functions of the security system. Also in communication with the control panel is an auxiliary security device. The auxiliary security device may comprise an assortment of devices that perform ancillary functions that enhance the functionality of the security control panel.

A further embodiment of the present invention comprises a wireless doorbell and security control panel activation system. The system has a transmitter, wherein the transmitter comprises at least two manual activation means. Further, the system has a control panel that is in communication with the transmitter and additionally has a receiver for receiving signals from the transmitter. At least two keypad that are individually configured to be activated in response to the control panel's reception of a signal from one predetermined transmitter manual activation means that is associated with an individual keypad. Also, at least two auxiliary security devices are configured to be activated in response to the control panel's reception of a signal from one predetermined transmitter manual activation means.

A yet further embodiment of the present invention comprises a method for implementing a wireless doorbell and security control panel activation system. The method comprises the steps of manually activating a transmitter and transmitting a signal in response to the manual activation of the transmitter. Next, the transmitted signal is received at a control panel. In response to the signal received at the control panel, a doorbell chime is broadcast in addition to an auxiliary security device being activated.

BRIEF DESCRIPTION OF DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Embodiments of the present invention are described below in detail. The disclosed embodiments are intended to be illustrative only, since numerous modifications and variations therein will be apparent to those of ordinary skill in the art. In reference to the drawings, like numbers will indicate like parts continuously throughout the views.

Figure 1:
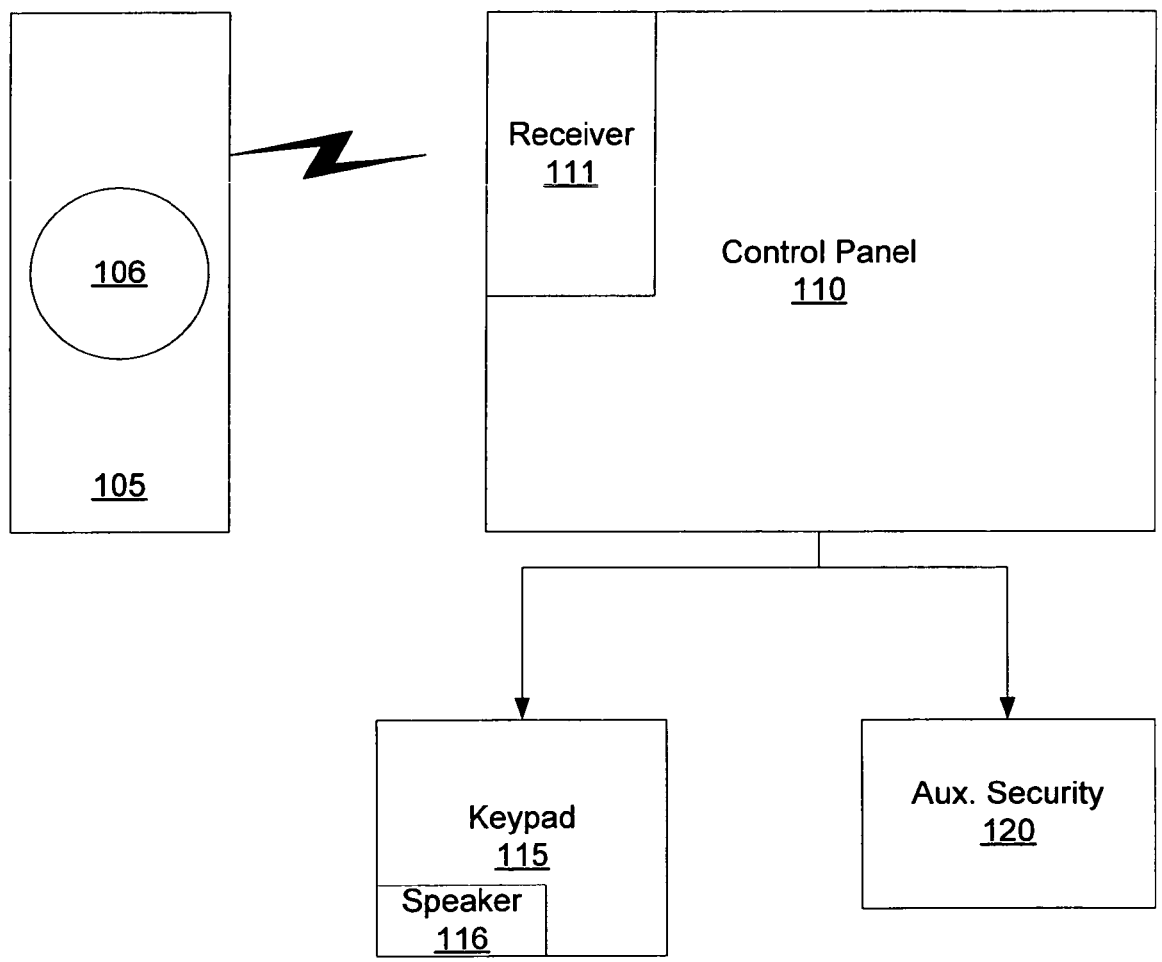
FIG. 1 is a diagram illustrating an embodiment of the present invention that comprises a single manual activation means.

The present invention is initially described in reference to FIG. 1. As shown in FIG. 1, the present invention comprises a wireless security transmitter 105. The wireless security transmitter 105 can be comprised within a typical doorbell and can be implemented using conventional wireless signal transmission technology. The wireless transmitter 105 comprises a manual activation means 106, wherein a system user may manually activate the transmitter 105. The doorbell transmitter 105 serves as a direct wireless input to the security control panel 110. The control panel 110 further comprises a signal receiver 111 for the reception of signals transmitted from the transmitter 105.

A keypad 115 is in communication with the control panel 110, wherein the keypad 115 comprises a speaker device 116 for broadcasting a doorbell chime, an alarm or messages related to functions of the security system. Further, an auxiliary security device 120 is also in communication with the control panel 110. The auxiliary security device 120 may comprise an assortment of devices that perform ancillary functions that enhance the functionality of the security control panel (i.e., a video monitoring system, a secondary keypad, light activating device, etc.).

When the manual activation means 106 (i.e., a button, switch, etc.) of the transmitter 105 is activated, the transmitter 105 transmits a signal to the control panel 110. The signal transmitted from the transmitter 105 is received at the receiver 111 and in response the security control panel 110 transmits a control signal to the keypad 115 and auxiliary security device 120. Unless it is configured to do otherwise, the keypad 115 will broadcast a doorbell chime sound upon reception of the control signal form the control panel 110. Further, upon reception of the control signal from the control panel 110, the auxiliary security system will activate. For example, in the instance where the auxiliary security device is a video monitoring system then the control panel trigger would activate a video monitoring system that is configured to monitor the door where the doorbell transmitter 105 is installed.

Figure 2:
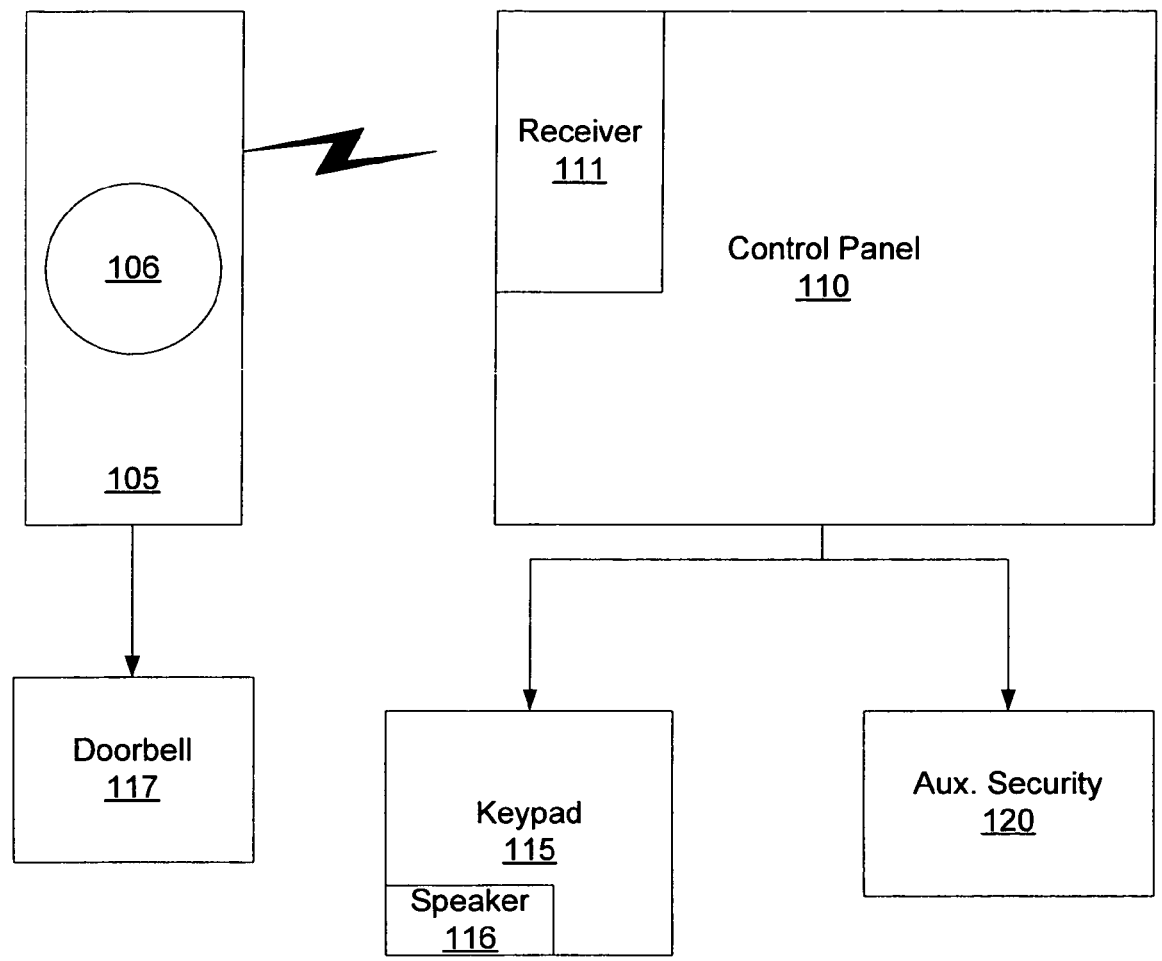
FIG. 2 is a diagram illustrating an embodiment of the present invention wherein the transmitter is coupled to a pre-existing low voltage doorbell.

FIG. 2 illustrates an embodiment of the present invention wherein the manual activation means of the transmitter 105 is configured to embody a two-pole switch. One pole and set of contacts of the transmitter 105 will be used to activate the transmitter. A second pole and set of contacts will facilitate the connection of the wire of a pre-existing low voltage doorbell 117 to the transmitter 105.

As mentioned above, when the manual activation means 106 of the transmitter 105 is activated, the transmitter 105 transmits a signal to the control panel 110. Further, by way of the hard-wired connection to the pre-existing doorbell 117, the transmitter 105 activates the pre-existing doorbell 117. The signal transmitted from the transmitter 105 is received at the receiver 111, and in response the security control panel 110 transmits a control signal to the auxiliary security device 120. Upon reception of the control signal from the control panel 110, the auxiliary security system is activated. As mentioned above an auxiliary security device 120 may comprise an assortment of devices that perform ancillary functions that enhance the functionality of the security control panel.

Figure 3:
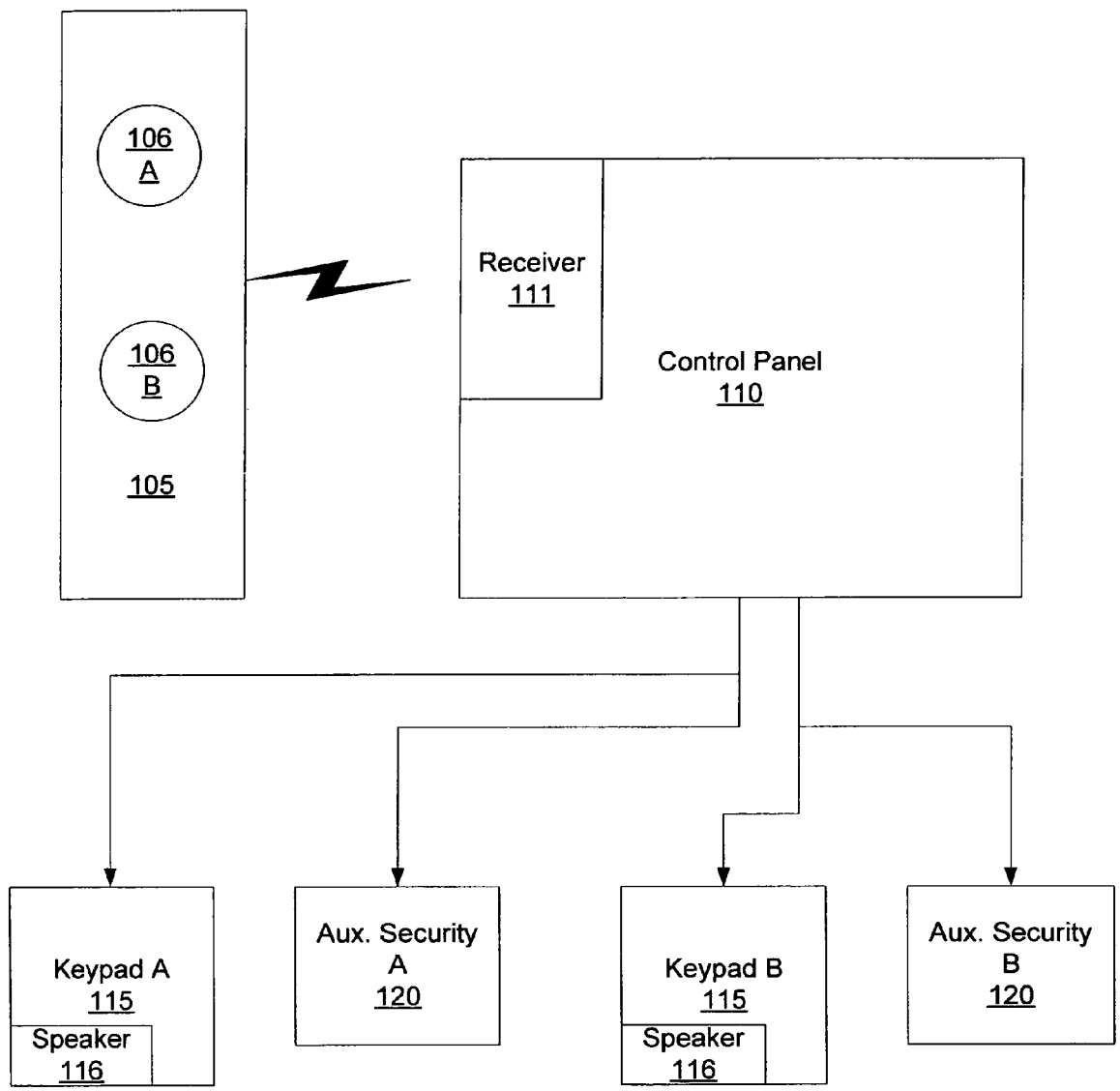
FIG. 3 is a diagram illustrating an embodiment of the present invention that comprises multiple manual activation means.

FIG. 3 illustrates a further embodiment of the present invention wherein the present invention comprises a means to activate a system comprising multiple keypad or pre-existing doorbells and auxiliary security devices. This particular configuration would support a dwelling or commercial structure that requires multiple security systems.

The transmitter 105 comprises multiple channels, wherein each channel is configured to activated in accordance to a specific manual activation means 106A and 106B. Upon the reception of a signal transmitted from the transmitter 105, the control panel 110 determines which manual activation means 106A or 106B triggered the transmission of the signal and accordingly transmits a control signal to the appropriate keypad 115A or 115B and auxiliary security device 120A or 120B. Upon receiving the signal from the control panel 110, the auxiliary security device 120A or 120B is activated and the keypad 115A or 115B broadcasts a doorbell chime.

As described in previous embodiments, the present embodiment may also be configured to embody a multiple-pole switch that is wired to the transmitter 105. Depending on the number of manual activation means that are required, a pole and set of contacts will be dedicated to each manual activation means 106 of the transmitter 105, wherein the manual activation means 106 will be used to activate the transmitter 105. Another set of poles and contacts will facilitate the connection of the wires of pre-existing low voltage doorbells 117 to the transmitter 105.

As mentioned above, when the manual activation means 106 of the transmitter 105 is activated, the transmitter 105 transmits a signal to the control panel 110. Further, by way of the hard-wired connection to the pre-existing doorbell 117, the transmitter 105 activates the pre-existing doorbell 117.

Figure 4:
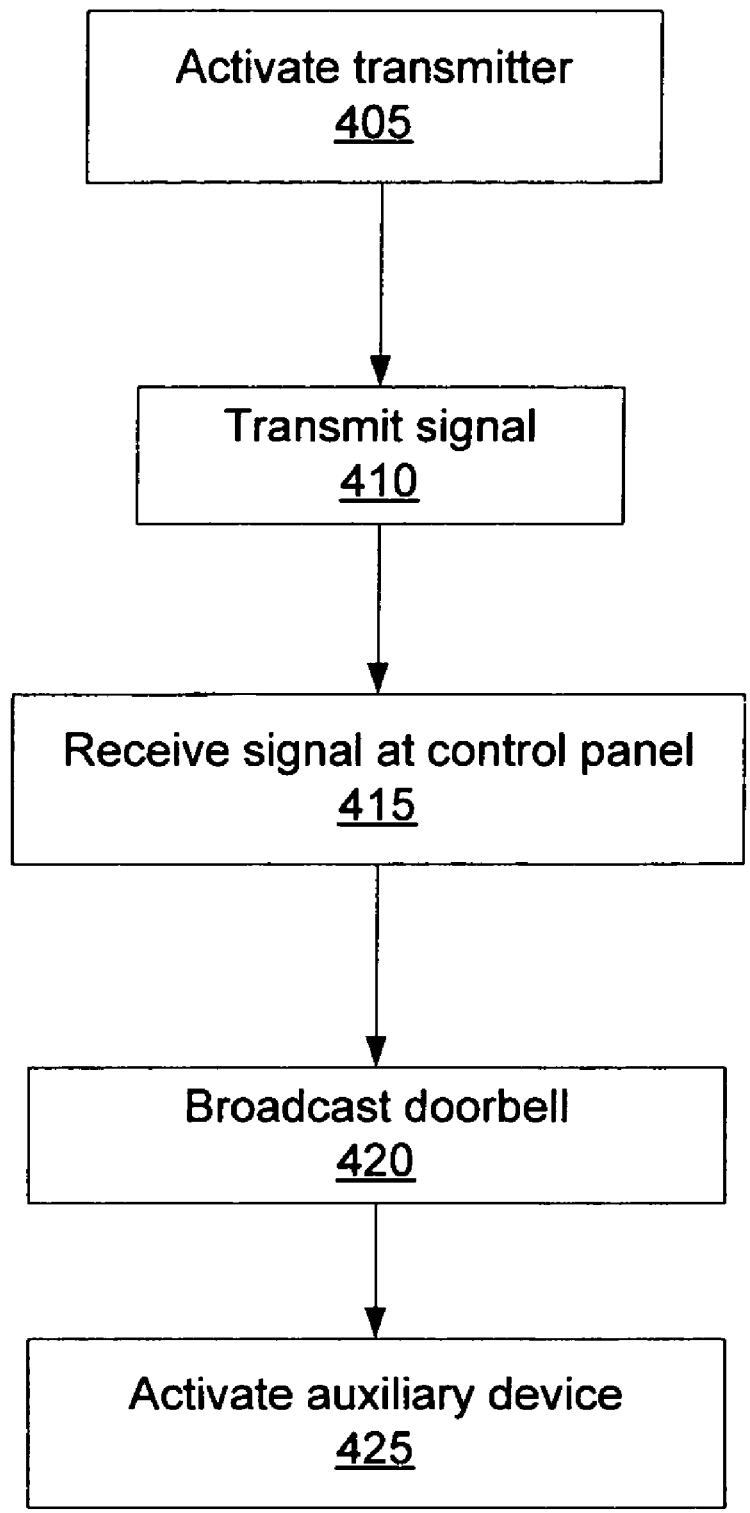
FIG. 4 is a flow diagram illustrating a method of use that relates to the present invention.

FIG. 4 is a flow diagram illustrating a method for implementing a wireless doorbell and security control panel activation system. At step 405, a transmitter 105 is manually activated and in response at step 410 a signal is transmitted in response to the manual activation of the transmitter 105. At step 415, the transmitted signal is received at the control panel 110. In response to receiving the signal at the control panel 110, the control panel transmits a control signal to the keypad 115, wherein at step 420 the keypad broadcasts a doorbell chime in response to the signal received at the control panel 110. Further, at step 425, an auxiliary security device 120 is activated in response to the signal received at the control panel 110. Further embodiments of the invention can comprise the step of having the doorbell chime in response to the step of manually activating the transmitter.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed:

1. A wireless doorbell and security control panel activation system, comprising:
   a transmitter, wherein the transmitter comprises a manual activation means;
   a control panel in communication with the transmitter, the control panel comprising a receiver for receiving signals transmitted from the transmitter;
   a keypad in communication with the control panel, wherein the keypad comprises a speaker device; and
   an auxiliary security device in communication with the control panel.

2. The system of claim 1, wherein upon the activation of the manual activation means, the transmitter transmits a signal to the control panel.

3. The system of claim 2, wherein upon receiving the signal transmitted from the transmitter, the control panel transmits an activation signal to the keypad and the auxiliary security device, and upon receiving the signal from the control panel the auxiliary security device is activated and the keypad broadcasts a doorbell chime.

4. The system of claim 3, wherein the auxiliary security device is a video monitoring system.

5. The system of claim 4, wherein the manual activation means is a doorbell button.

6. The system of claim 2, wherein the transmitter is electrically connected to a doorbell chime.

7. The system of claim 6, wherein upon receiving the signal transmitted from the transmitter, the control panel transmits an activation signal to the auxiliary security device, and upon receiving the signal from the control panel, the auxiliary security device is activated.

8. The system of claim 7, wherein upon the activation of the manual activation means, the transmitter activates the doorbell chime.

9. The system of claim 8, wherein the auxiliary security device is a video monitoring system.

10. The system of claim 9, wherein the manual activation means is a doorbell button.

11. A wireless doorbell and security control panel activation system, comprising:
    a transmitter, wherein the transmitter comprises at least two manual activation means;
    a control panel in communication with the transmitter, the control panel comprising a receiver for receiving signals from the transmitter;
    at least two keypads, wherein each keypad is configured to be activated in response to the control panel's reception of a signal from one predetermined transmitter manual activation means; and
    at least two auxiliary security devices, wherein each security device is configured to be activated in response to the control panel's reception of a signal from one predetermined transmitter manual activation means.

12. The system of claim 11, wherein upon the activation of a manual activation means, the transmitter transmits a signal to the control panel.

13. The system of claim 12, wherein upon receiving the signal transmitted from the transmitter, the control panel transmits an activation signal to the keypad and the auxiliary security devices that are configured to be associated with the manual activation means, and upon receiving the signal from the control panel, the auxiliary security device is activated and the keypad broadcasts a doorbell chime.

14. The system of claim 13, wherein at least one of the auxiliary security devices is a video monitoring system.

15. The system of claim 14, wherein the manual activation means is a doorbell button.

16. The system of claim 12, wherein the transmitter is electrically connected to a doorbell chime.

17. The system of claim 16, wherein upon receiving the signal transmitted from the transmitter, the control panel transmits an activation signal to the auxiliary security device, and upon receiving the signal from the control panel, the auxiliary security device is activated.

18. The system of claim 17, wherein upon the activation of the manual activation means, the transmitter activates the doorbell chime.

19. The system of claim 18, wherein at least one of the auxiliary security devices is a video monitoring system.

20. The system of claim 19, wherein the manual activation means is a doorbell button.

21. A method for implementing a wireless doorbell and security control panel activation system, comprising the steps of:
    manually activating a transmitter;
    transmitting a signal in response to the manual activation of the transmitter;
    receiving the transmitted signal at a control panel;
    selectively activating a speaker device of a keypad in response to the signal received at the control panel and based on a setting of the control panel, the speaker device being adapted for broadcasting a doorbell chime; and
    activating an auxiliary security device in response to the signal received at the control panel.

22. The method of claim 21, wherein the doorbell chime is broadcast in response to the step of manually activating the transmitter.

* * * * *